United States Patent [19]

Gyory

[11] 4,172,696
[45] Oct. 30, 1979

[54] LOW STRESS SUCTION OR DISCHARGE REED VALVE FOR COMPRESSOR

[75] Inventor: Emeric J. Gyory, Park Ridge, Ill.

[73] Assignee: Borg-Warner Corporation, Chicago, Ill.

[21] Appl. No.: 896,822

[22] Filed: Apr. 17, 1978

[51] Int. Cl.² ........................ F04B 9/08; F16K 15/14
[52] U.S. Cl. .................................... 417/564; 137/885
[58] Field of Search ................ 417/559, 564; 137/885, 137/886

[56] References Cited

U.S. PATENT DOCUMENTS

| 3,066,856 | 12/1962 | Frank | 417/564 |
| 3,403,847 | 10/1968 | Parker | 417/564 |

Primary Examiner—William L. Freeh
Attorney, Agent, or Firm—Thomas B. Hunter

[57] ABSTRACT

An improved low stress reed valve especially adapted for use as a suction or discharge valve in a reciprocating compressor or the like. The geometry and the relationship of certain key dimensions result in a substantially reduced stress on the valve, thus extending the life of such valves in normal operation.

2 Claims, 3 Drawing Figures

U.S. Patent  Oct. 30, 1979  4,172,696
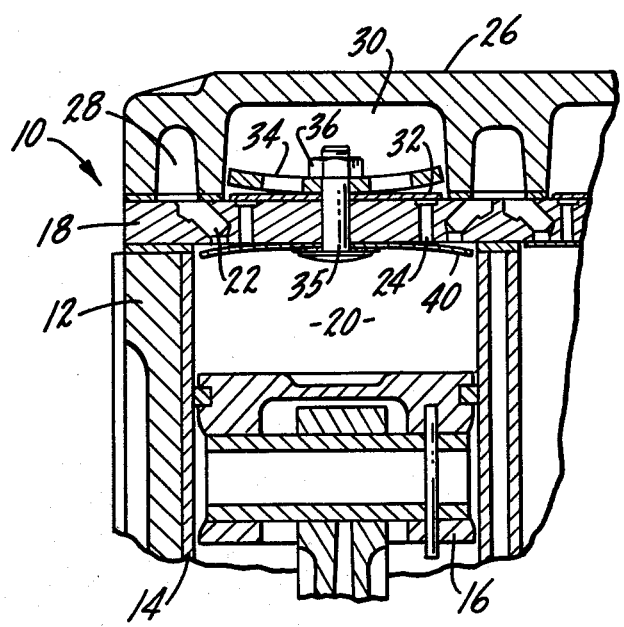
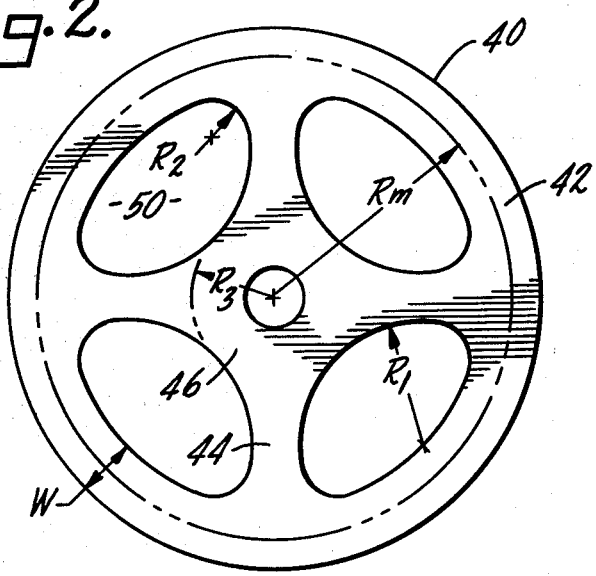

LOW STRESS SUCTION OR DISCHARGE REED VALVE FOR COMPRESSOR

BACKGROUND OF THE INVENTION

1. Field of the Invention

Reed type suction or discharge valves classified in Class 137-885.

2. Description of the Prior Art

York Automotive Suction and Discharge Valves—Part Nos. 022-03175-A and 022-03491-A.

SUMMARY OF THE INVENTION

The present invention is directed to a reed type valve and more particularly to a circular reed valve in which an annular portion controls the flow of fluid through a series of ports in a valve plate, said annular portion seating on the valve plate and being connected to a hub at the center thereof by a plurality of spokes radiating from the hub. The hub portion is secured to the valve plate; and since the entire valve is made of thin, resilient spring steel, the spokes will flex allowing the annular portion to lift off the valve plate and allow flow of gas or vapor through the ports upon application of a predetermined pressure differential.

Reed valves are used to control the flow of fluids and, as in the present case, generally permit flow in one direction only. Reed valves, as indicated above, open only upon application of a pressure difference, the higher pressure being at the upstream side and the lower pressure at the downstream side of the reed. When used as a suction valve, the reed is affixed to the underside of a valve plate separating the gas working space from a suction plenum. The suction plenum (on the opposite side of the valve plate) is supplied with fluid to be compressed in the gas working space. When the piston creates a sufficient pressure differential between the suction plenum and the gas working space, then the valve will open, allowing gas or vapor to flow into the working space. Upon reversal of the piston, the pressure differential will become smaller and the valve will then close because of the inherent resiliency of the metal reed. When the pressure is sufficiently higher than the gas in the discharge plenum, the discharge valve, which may also be a reed type valve, will open and permit flow from the gas working space to the discharge gas plenum adjacent the suction plenum on the opposite side of the valve plate.

Reed valves are subjected to extremely high working stresses in operation. They are required to flex open and then close during each cycle of the piston. At high speeds, these reed valves are subjected to such rapid oscillation that premature failure of the reed may result with the possibility of breakage and separation of portions of the valve. This is an especially serious problem with suction valves, because any part of the valve which broke off would tend to fall into the gas working space and possibly cause seizure of the piston in the cylinder virtually destroying the compressor.

In the present invention, the geometric relationship between valve diameter, thickness, and certain key radii has been found to materially reduce the stresses in this type of valve. In addition, the specified geometry is more conducive to obtaining properly rounded edges when the valves are finished by means of a ballmilling process or similar deburring procedures.

DESCRIPTION OF THE DRAWINGS

FIG. 1 is a partial cross-section view of the top portion of a reciprocating compressor showing the head, the valve plate, the cylinder block and a portion of the piston, as well as the valve assembly;

FIG. 2 is a plan view of the suction or discharge reed valve forming the subject matter of the present invention; and FIG. 3 is an edge elevation view of the valve.

DETAILED DESCRIPTION OF THE PREFERRED EMBODIMENT

FIG. 1 represents a typical compressor of the type used in automotive air conditioning compressors, although it should be understood that the invention is equally applicable to other types of compressors including air compressors etc. The compressor 10, includes a housing 12 having a cast-in-place cylinder 14 therein receiving a piston 16 which is driven by means (not shown) including a connecting rod and crankshaft connected to a rotary power source. A valve plate 18 closes off the top of the cylinder to define a gas working space 20 and is provided with a series of suction ports 22 and a series of discharge ports 24. On top of the valve plate there is secured a head member 26 which is divided into a suction plenum 28 and a discharge plenum 30 communicating respectively to suction gas and discharge gas connections (also not shown). On the upper surface of the valve plate is the discharge valve assembly which includes a reed valve 32 overlying the discharge ports and a valve stop 34 to prevent overtravel of the discharge valve when it is open. The discharge valve is secured to the valve plate by a stud 35 and nut 36 extending through the valve plate. The suction valve 40 is secured to the underside of the valve plate by stud 35 and normally closes the suction ports 22.

Referring now to FIG. 2, which is a plan view of suction valve 40 and/or discharge valve 32, the valve, formed as a thin wafer of spring steel has a series of four equidistantly spaced spokes 44 joining a hub portion 46 with an annular portion 42. The perimeter of the valve is circular and the outer dashed line which is the mean radius $R_m$ of the annular portion 42 represents a circle passing through the center of each of the suction ports equidistant from the inner and outer diameters of the annular portion 42. The spoke portions 44 which radiate outwardly from the hub, and the annulus 42, define open areas 50 which are somewhat oval shaped. The inner circle having radius $R_3$ represents a circle which is tangent to the root radius $R_1$ which is an arc at the radially inner portion of the open areas and forms the base of two adjacent spokes. The radius $R_2$ at opposite ends of the open areas is referred to as the spoke blend radius. The thickness of the reed, which is uniform throughout the valve, is denoted by T; and the width of the annular portion is designated by W.

In defining the subject valve, the specified geometry for maximizing operational performance and valve life was found to be as follows:

1. the spring thickness T is preferably from 0.013 $R_m$ to 0.031 $R_m$.
2. the thickness W of the annular portion is from 0.20 $R_m$ to 0.30 $R_m$.
3. the root radius $R_1$ is from 0.49 $R_m$ to 0.53 $R_m$.
4. the spoke blend radius $R_2$ is from 0.14 $R_m$ to 0.17 $R_m$.

5. the circle $R_3$ tangent to the root radius is from 0.20 Rm to 0.40 Rm.

While this invention has been described in connection with certain specific embodiments thereof, it is to be understood that this is by way of illustration and not by way of limitation; and the scope of the appended claims should be construed as broadly as the prior art will permit.

What is claimed is:

1. A reed valve formed of a wafer of spring steel and having a generally uniform thickness T, said valve comprising: a hub portion adapted to be secured to a stationary valve plate; four spokes extending radially outwardly from said hub portion and spaced equally equidistantly from each other; and an annular portion encircling said hub portion, said annular portion having a mean radius Rm, a width W, a generally circular perimeter and a surface adapted to seat on said valve plate to control the flow of fluid through a series of ports in said valve plate, said hub portion, said spokes and said annular portion forming four, generally congruent open areas each of which has a root radius $R_1$ forming the base of adjacent spokes, a radius $R_3$ of an imaginary circle tangent to the root radius and a spoke blend radius $R_2$ forming the transition between $R_1$ and the inner edge of the annular portion, the geometry of said reed valve being characterized as follows:
   1. the spring thickness T being from 0.013 Rm to 0.031 Rm;
   2. the width of the annular portion being from 0.20 Rm to 0.30 Rm;
   3. the root radius $R_1$ being from 0.49 Rm to 0.53 Rm;
   4. the spoke blend radius $R_2$ being from 0.14 Rm to 0.17 Rm; and
   5. the circle tangent to the root radius $R_3$ being from 0.20 Rm to 0.40 Rm.

2. A reciprocating compressor comprising: a cylinder block having at least one cylinder formed therein; a piston reciprocatively moveable within said cylinder; a valve plate having a series of suction ports and a series of discharge ports arranged in a circular pattern and extending through said valve plate; a head member having a first chamber communicating with said suction ports and a second chamber communicating with said discharge ports; a suction valve having a portion normally closing said suction ports; and a discharge valve on the opposite side of said valve plate normally closing said discharge ports, at least one of said valves being formed of a wafer of spring steel having a generally uniform thickness T and attached in the central portion thereof to said valve plate, said valve including a hub portion adapted to be secured to said valve plate; four spokes extending radially outwardly from said hub portion and spaced equally equidistantly from each other; and an annular portion encircling said hub portion, said annular portion having a mean radius Rm, a width W, a generally circular perimeter and a surface adapted to seat on said valve plate to control the flow of fluid through one set of said ports in said valve plate, said hub portion, said spokes and said annular portion forming four, generally congruent open areas each of which has a root radius $R_1$ forming the base of adjacent spokes, a radius $R_3$ of an imaginary circle tangent to the root radius and a spoke blend radius $R_2$ forming the transition between $R_1$ and the inner edge of the annular portion, the geometry of said reed valve being characterized as follows:
   1. the spring thickness T being from 0.013 Rm to 0.031 Rm;
   2. the width of the annular portion being from 0.20 Rm to 0.30 Rm;
   3. the root radius $R_1$ being form 0.49 Rm to 0.53 Rm;
   4. the spoke blend radius $R_2$ being from 0.14 Rm to 0.17 Rm; and
   5. the circle tangent to the root radius $R_3$ being from 0.20 Rm to 0.40 Rm.